United States Patent [19]

Mosser et al.

[11] Patent Number: 5,187,984
[45] Date of Patent: Feb. 23, 1993

[54] HYDROSTATIC PRESSURE TRANSDUCER

[75] Inventors: Vincent Mosser, Vanves; Jean-Louis Robert, Le Cres; Sylvie Contreras, Gignac, all of France

[73] Assignee: Schlumberger Industries, Montrouge, France

[21] Appl. No.: 691,906

[22] Filed: Apr. 26, 1991

[30] Foreign Application Priority Data

Apr. 27, 1990 [FR] France ................. 90 05371

[51] Int. Cl.⁵ .................. G01L 9/06; G01L 19/04
[52] U.S. Cl. ........................... 73/708; 73/721; 73/727; 338/4; 374/143
[58] Field of Search ............. 73/706, 708, 720, 721, 73/717, 723, 726, 727, 753, 754, DIG. 4; 338/4; 29/621.1; 374/143

[56] References Cited

U.S. PATENT DOCUMENTS

| | | | |
|---|---|---|---|
| 3,034,345 | 5/1962 | Mason | 357/26 |
| 3,443,167 | 5/1969 | Willardson | 73/862.63 |
| 4,554,927 | 11/1985 | Fussell | 374/143 |
| 4,986,127 | 1/1991 | Shimada et al. | 374/143 |

FOREIGN PATENT DOCUMENTS

| | | |
|---|---|---|
| 3211968 | 10/1983 | Fed. Rep. of Germany . |
| 2629640 | 10/1989 | France . |
| 665028 | 4/1988 | Switzerland . |

Primary Examiner—Donald O. Woodiel
Attorney, Agent, or Firm—Sanford J. Asman

[57] ABSTRACT

A monolithic pressure and/or temperature transducer comprises at least two sensitive semiconductor layers of III-V material sensitive to pressure and to temperature and supported by a common substrate of III-V material, which two layers comprise: a first layer doped with donor type impurities at a first concentration and having a first resistivity as a function of pressure and of temperature; and a second layer doped with donor type impurities at a second concentration different from the first concentration and having a second resistivity as a function of pressure and of temperature, which second resistivity depends on temperature in a different manner than the first resistivity.

12 Claims, 4 Drawing Sheets

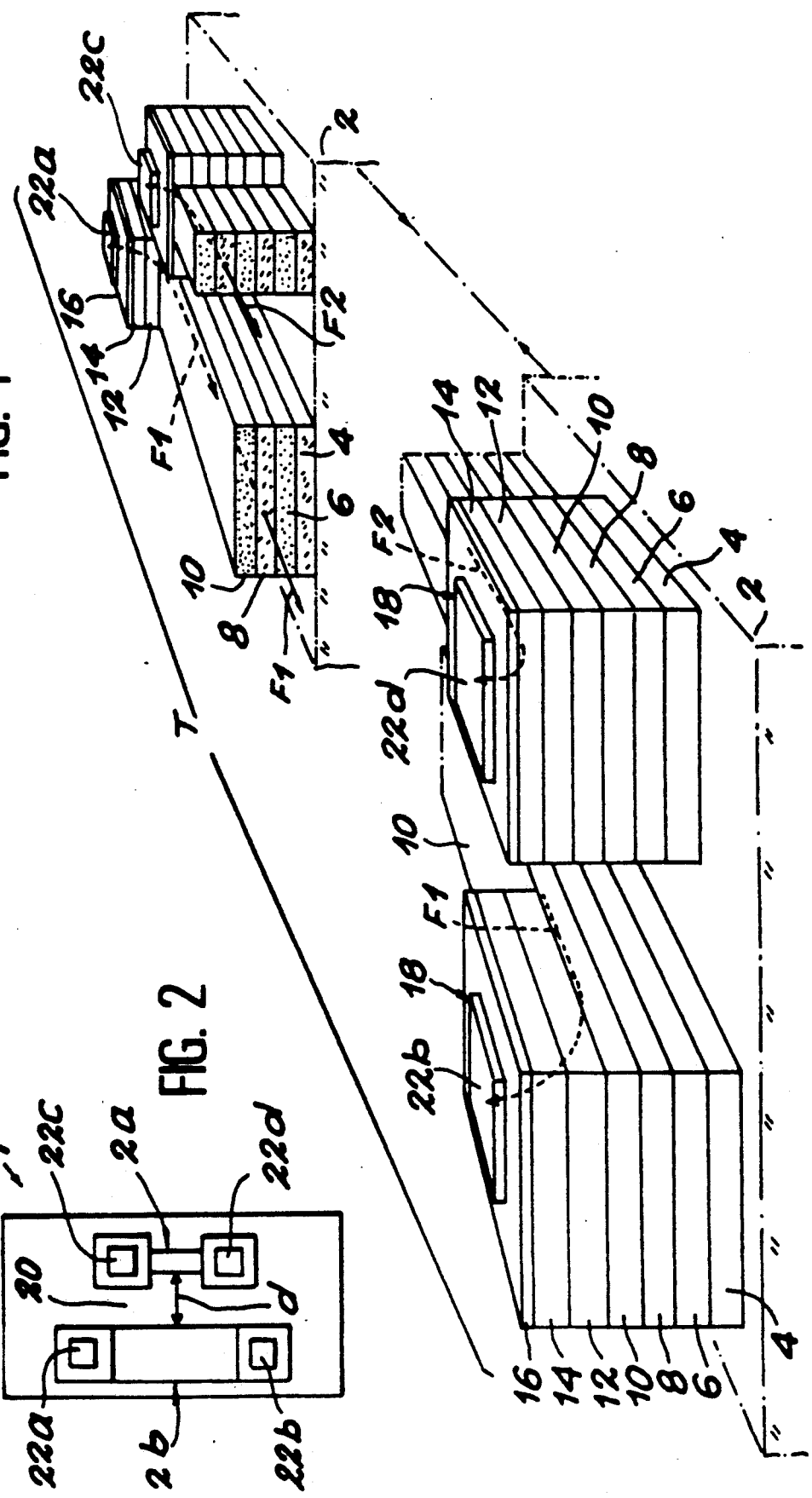

HYDROSTATIC PRESSURE TRANSDUCER

DESCRIPTION

The present invention relates to a hydrostatic pressure transducer and/or temperature transducer for use, in particular, in measuring the pressure to which a fluid is subjected at temperatures that may be as high as 200° C. It is particularly suitable for high pressures, typically in the range $5 \times 10^7 Pa$ to $20 \times 10^7 Pa$ with resolution and accuracy comparable to or even better than conventional pressure gauges.

The transducer of the invention is a semiconductor transducer.

BACKGROUND OF THE INVENTION

Prior art semiconductor-based pressure sensors generally make use of a structure comprising four silicon gauges disposed in a Wheatstone bridge, and deliberately doped with acceptor impurities so as to have P type conductivity, such gauges being made by diffusing or implanting impurities in a silicon substrate having N type conductivity.

The effect made use of is piezoresistivity which shows up in the electrical resistance of each gauge varying as a function of the stress to which the gauge is subjected by pressure being applied thereto.

Since the resistivity of silicon is sensitive only to single-axis and to two-axis stresses, it is not directly sensitive to hydrostatic pressure, so sensors of this type are designed in such a manner that the application of a hydrostatic pressure gives rise to the appearance of such stresses. To do this, such a sensor includes a membrane made by etching one of its faces, which face is subjected to a reference pressure, while the other face supporting the strain gauges is subjected to the hydrostatic pressure to be measured in such a manner as to ensure that on said face, there appears a system of stresses that are directed mainly in the plane of the membrane.

By suitably selecting the positions of the gauges relative to said system of stresses, the electrical resistance of two of the gauges will increase with applied pressure while the electrical resistance of the other two decreases. The Wheatstone bridge is thus taken out of balance and a signal can thus be obtained which depends on the pressure.

Although the properties of such sensors are quite satisfactory in numerous applications, they nevertheless suffer from limitations that are detrimental to their use in certain particular cases, some of which cases are important.

In particular, not only is the signal delivered by sensors of this type intrinsically representative both of pressure and of temperature, but it always turns out to be extremely difficult to provide proper temperature correction for such a signal representative of pressure and of temperature.

In addition, all such sensors manifest the problems inherent to composite structures, in particular problems of long term stability and of hysteresis.

Proposals have already been made in patent Document FR-A-2 629 640 by the present Assignee to remedy these drawbacks by providing a temperature-correcting hydrostatic pressure transducer making use of a pressure-sensitive layer constituted by a ternary material made up of elements taken from columns III and V of the periodic table and grown epitaxially on a binary substrate of III-V material, said transducer further including a temperature sensor supported on the same substrate and suitable for providing a signal representative of the temperature thereof. In a particular embodiment, this temperature sensor also includes a semiconductor layer of III-V ternary material overlying the pressure-sensitive layer and separated therefrom by an insulating layer of III-V ternary material.

That transducer provides improvements over sensors having silicon piezoresistive gauges.

An object of the present invention is to provide a novel III-V material monolithic transducer serving, in particular, to provide electrical signals that are a function of the hydrostatic pressure and the temperature of the medium surrounding the transducer.

SUMMARY OF THE INVENTION

More precisely, the present invention provides a monolithic pressure and/or temperature transducer comprising at least two sensitive semiconductor layers of III-V material which are sensitive to pressure and to temperature, and which are supported by a common substrate of III-V material, said at least two sensitive layers comprising:

a first layer doped with donor type impurities at a first concentration and having a first resistivity as a function of pressure and of temperature; and a second layer doped with donor type impurities at a second concentration different from the first concentration and having a second resistivity as a function of pressure and of temperature, which second resistivity depends on temperature in a different manner than the first resistivity.

Two resistivity values are thus obtained for the same pressure and the same temperature, and the temperature and the pressure of the medium surrounding the transducer can be determined accurately by solving the system of two equations in two unknowns.

The invention is based in particular on the observation that the temperature sensitivity of the two semiconductor layers of III-V material can be modulated by acting on the doping level of the sensitive layers, where doping level is a parameter that is easily controlled. In addition, the value of the resistivity of these layers changes only by a factor of 5 to 10 as a function of doping even for a variation in dopant concentration greater than $10^3$.

In order to facilitate determining the pressure and the temperature of a given medium, it is possible to use a pressure and temperature transducer which includes a third semiconductor layer of III-V material which is sensitive to pressure and to temperature, and which is doped with impurities of the same type as the first and second layers, but at a concentration which is different from both the first and the second concentrations, thereby causing it to present a third resistivity whose temperature dependence differs from that of the first and second resistivities. Three resistivity values are thus obtained for the same pressure and the same temperature.

The above-mentioned limitations of composite sensors do not apply in the present case of a sensor whose transducer is directly sensitive to hydrostatic pressure, in particular because of the uniform structure thereof.

Surprisingly, the Applicant has found that two sensitive layers having the same composition but with different doping gives rise to pressure sensitivities that are similar, in association with temperature sensitivities that are very different. The pressure sensitivity of such layers depends essentially on the composition thereof.

Advantageously, the layers sensitive to pressure and to temperature are layers made of material including at least three elements from columns III and V of the periodic table of elements; and they preferably have the same composition of III and V elements. Advantageously, when making a pressure sensor, this substantially common composition is optimized as a function of the application to measuring this magnitude, e.g. as a function of sensitivity.

These layers may be made of a ternary material in which the III elements are aluminum, gallium, and indium, in particular, and in which the V elements are phosphorus, arsenic, and antimony, in particular.

The following materials may be used for the sensitive layer: $GaAs_uP_{1-u}$, $In_vGa_{1-v}As_wP_{1-w}$, and $Al_xGa_{1-x}As$, where u, v, w, and x are selected to lie in the range 0 to 1 so that the lattice constant is compatible with that of the substrate on which these materials are grown epitaxially.

In an embodiment of the transducer of the invention having good performance, the sensitive layers are constituted by doped gallium and aluminum arsenide of formula $Al_xGa_{1-x}As$ in which the aluminum concentration x is chosen to lie in the range 0.22 to 0.40, with the substrate being gallium arsenide (GaAs).

Advantageously, the aluminum fraction x in the sensitive layers is selected to lie in the range 0.27 to 0.37, and more precisely in the range 0.30 to 0.35.

The layers sensitive to pressure and to temperature are preferably doped with impurity elements from column IV-B of the periodic table, and more particulary by ions of silicon, germanium, or tin.

The difference in doping ion concentration between the two (or three) sensitive semiconductor layers is preferably as large as possible. Thus, one of the two layers may have a concentration of doping ions that is as low as possible, taking account in particular of the residual impurities in the III-V material after it has been manufactured, while the other sensitive layer may have a concentration which is as high as possible while taking account of problems of doping ion saturation in the III-V material. For example, one of the sensitive layers may have a concentration of not more than $10^{17}$ atoms/cm$^3$ while the other layer may have a concentration of not less than $10^{18}$ atoms/cm$^3$.

In an embodiment suitable for simplified and reproducible implementation, the sensitive layers overlie each other and are separated by a separator layer of III-V material whose conduction band energy is greater than that of the sensitive layers. In addition they are formed by epitaxy.

For sensitive layers of gallium and aluminum arsenide, the separator layer may also be constituted by gallium and aluminum arsenide $Al_yGa_{1-y}As$ with $y > x$ and selected, in particular, to lie in the range 0.25 to 0.50, and preferably in the range 0.35 to 0.45, said material being not intentionally doped.

In an embodiment of the transducer of the invention, the transducer comprises a first resistive device comprising a first zone of the first sensitive layer and a zone of the second sensitive layer that overlie each other and that are separated by the separator layer, and a second resistive device comprising a second zone of said first sensitive layer.

In this case, it is preferable for the sensitive layer having the lowest concentration of doping ions to be situated between the sensitive layer having the highest concentration of doping ions and the substrate.

Advantageously, the first resistive device further includes a first pair of metal contacts established on the zone of the second sensitive layer and separated from each other, and the second resistive device includes a second pair of metal contacts established on the second zone of the first sensitive layer, and separated from each other.

For the sensitive layers made of $Al_xGa_{1-x}As$ having $0.23 \geq x \geq 0.40$, the transducer of the invention may advantageously comprise the following stack of layers on the GaAs substrate: a buffer layer of GaAs that is not intentionally doped; a separator layer of $Al_zGa_{1-z}As$ that is not intentionally doped and in which the aluminum fraction z increases smoothly from 0 to x, a bottom active layer of $Al_xGa_{1-x}As$ that is N-doped; a separator layer of $Al_yGa_{1-y}As$ that is not intentionally doped where $0.25 \leq y \leq 0.50$ and $y > x$; a top active layer of $Al_xGa_{1-x}As$ that is N-doped; a protective layer of $Al_tGa_{1-t}As$ that is not intentionally doped, with $0.22 \leq t \leq 0.60$; a contact-making layer of N+doped GaAs; and a metal contact layer.

BRIEF DESCRIPTION OF THE DRAWINGS

An embodiment of the invention is described by way of example with reference to the accompanying drawings, in which:

FIG. 1 is a perspective view of one example of a transducer constituting a first variant of the invention;

FIG. 2 is a plan view of the transducer of the invention shown in FIG. 1;

FIG. 4 shows the variations in temperature sensitivity ST of these layers expressed in °C.$^{-1}$ as a function of temperature T expressed in °C.; FIG. 5 shows the variations in electrical resistance of these layers expressed in ohms as a function of temperature T expressed in °C.; and FIG. 6 is a plot of equal resistance curves for the two layers at different pressure values expressed in kPa, as a function of temperature T expressed in °C.

DETAILED DESCRIPTION

Figure 3:
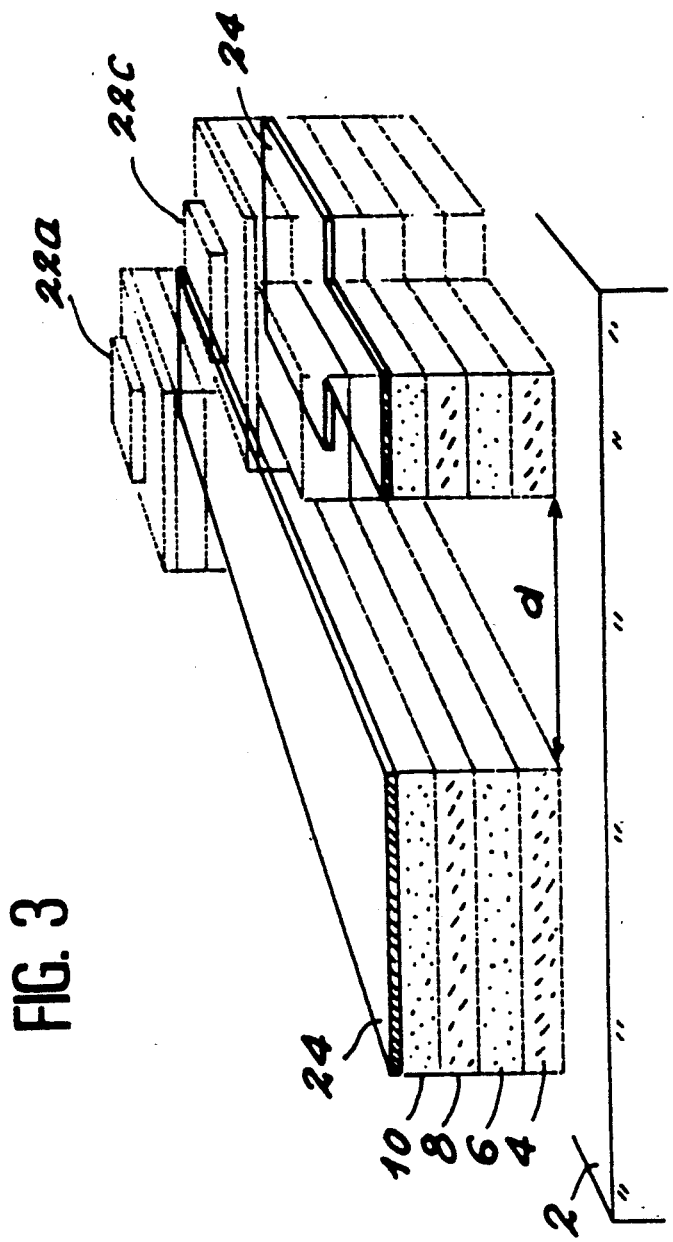
FIG. 3 is a perspective view of a second variant of a transducer of the invention.

The transducer T shown in FIG. 1 comprises a substrate 2 of III-V material (e.g. GaAs) which is made semi-insulating by addition of chromium, in particular. The thickness of this substrate is about 300 micrometers and its resistivity is as high as possible.

A buffer layer 4 having the same composition as the substrate and a thickness of not less than about 1 micrometer is deposited by epitaxy on the substrate 2, thereby providing subsequent layers with a starting surface having a good degree of planeness and of good crystalographic quality. In particular, this layer 4 of GaAs is not intentionally doped. The layer 4 and all of the other semiconductor layers are deposited by molecular beam epitaxy (MBE) or by modified organometallic chemical vapor deposition (MOCVD).

A separator layer 6 of III-V material that is not intentionally doped is then deposited, still by epitaxy. The purpose of this layer is to prevent a two-dimensional layer of electrons appearing at the interface with the following layer. Advantageously, the composition of the layer 6 increases continuously from that of the buffer layer 4 to that of the immediately following layer 8. In this example, the thickness of the layer 6 is 100 mm to 200 mm.

Layer 8 deposited epitaxially on the layer 6 constitutes the first pressure and temperature sensitive semiconductor layer. It is constituted by $Al_xGa_{1-x}As$ with x equal to 0.33. It is N-type doped by silicon ions at a concentration which is advantageously not greater than $10^{17}$ atoms/cm$^3$. Its thickness lies in the range 1 micrometer ($\mu$m) to 2 $\mu$m.

With an active layer 8 of this nature, the separator layer 6 having a composition gradient is a layer of $Al_zGa_{1-z}As$ in which the aluminum fraction z increases smoothly from 0 to x i.e. from 0 to 0.33 going up from its bottom surface to its top surface. Nevertheless, it is also possible to use a separator layer of constant composition, providing its aluminum content is not less than that of the active layer 8.

Thereafter, a separator layer 10 of III-V material that is not intentionally doped is formed by epitaxy on the first active layer 8, with the conduction band energy of the layer 10 being greater than that of the active layer 8. Its purpose is to minimize the fraction of the current which passes into the layer 8 in those zones where the layer 8 has the second active layer 12 overlying it. In this case, the thickness of this separator layer is 1 $\mu$m to 2 $\mu$m. It is made, in particular, of $Al_yGa_{1-y}As$ where y>x, e.g. y=0.40.

The second pressure and temperature sensitive active layer 12 has the same composition as the layer 8, and in particular is made of $Al_xGa_{1-x}As$ where x is equal to 0.33, and it is 1 $\mu$m to 2 $\mu$m thick. It is doped with N-type ions, and in particular with silicon ions.

It differs from the layer 8 by its concentration of doping ions, and in this case said concentration is preferably greater than that of the layer 8, i.e. being about $10^{18}$ atoms/cm$^3$ of silicon ions, in this example.

The aluminum fraction x=0.33±2% in the layers 8 and 12 appears to correspond to an optimum in the sensitivity of these layers to pressure variations.

A protective layer 14 of III-V material that is not intentionally doped is then formed by epitaxy. This layer 14 may be identical in composition to the layer 12, or it may be different. To simplify manufacture, this protective layer is made of a material having the same composition at the layer 12, i.e. $Al_xGa_{1-x}As$ with x=0.33. It is 1 $\mu$m to 2 $\mu$m thick.

A layer 16 of N+ doped III-V material is then deposited epitaxially for the purpose of making electrical contacts. In this particular case, this layer is made of GaAs doped with silicon to a concentration of about $10^{19}$ atoms/cm$^3$. It is 5 nm to 50 nm thick.

The structure is terminated by depositing tabs 18 of metallization, e.g. by the "lift off" technique, well known to the person skilled in the art, and constituted in particular by a gold-germanium-nickel alloy formed between 450° C. and 500° C.

The various layers are etched at this stage of manufacture to obtain, in particular, the structure shown in FIGS. 1 and 2. The layer 16 is firstly eliminated outside the metal tabs by etching. Then the layers 4 to 14 are subjected to a first etching operation so as to form first and second islands respectively occupying a first zone 2a (to the right in FIGS. 1 and 2) and a second zone 2b (to the left in FIGS. 1 and 2) which are separated by a gap 20. These islands are formed in such a manner as to leave epitaxial semiconducting layers only in the two zones 2a and 2b. Elsewhere the substrate 2 is uncovered.

Thereafter, in the second zone 2b, a second etching operation is performed on the top layers 12 and 14 (except for the metal tabs 22a and 22b) so that apart from at the tabs, the separator layer 10 constitutes the outside layer.

The tabs of metallization on the island in the first zone 1a are given respective references 22c and 22d.

These two islands constitute two resistive devices whose resistances vary with pressure and temperature, but they respond very differently to temperature.

In conventional manner, it is then preferable to passivate the transducer by covering it with a passivation layer and then forming openings to gain access to the contact tabs 22a-22d. These tabs subsequently receive a further layer of metallization that stands proud of the passivation layer.

As shown in FIG. 2, it is preferable for the conduction channel of the resistive device in the first zone 2a to be narrower than the conduction channel of the resistive device in the second zone 2b so that the resistances of these two devices are of the same order of magnitude. This configuration is obtained during the first stage of etching the layers 4 to 14.

In such a structure, the dominant electrical currents that may be applied by external current sources between tabs 22a and 22b or between tabs 22c and 22d essentially follow the paths indicated diagrammatically by arrows F1 and F2.

In particular, in the first resistive device having two overlying active layers, the current applied between tabs 22c and 22d flows essentially along the upper active layer 12 because of the separator layer 10 which minimizes the fraction of the current passing along the lower active layer 8.

If the external sources deliver constant and known currents, then the voltages which appear between the tabs 22a and 22b or between the tabs 22c and 22d are essentially representative of the resistivity respectively of the bottom active layer 8 and of the top active layer 12. In addition, the resistivities of the active layers 8 and 12 are essentially representative of the temperature and of the pressure to which the transducer is subjected.

In order to ensure that the two islands in respective zones 2a and 2b are subjected to the same pressure and the same temperature, it is desirable for the distance d between the two islands (see FIG. 2) to be as small as possible, and typically 20 $\mu$m.

The second etching operation applied to the layers 12 to 14 in the second zone 2b should be performed in such a manner as to limit the thickness of the etching that occurs in the portion of the layer 10 which constitutes the outside layer of the transducer and which then serves as a protective layer.

To this end, the layer 12 may be etched by anisotropic reactive ion etching with the end of etching being monitored either as a function of time or else (as shown in FIG. 3) by using an etching stop layer 24 deposited epitaxially on the layer 10 immediately before epitaxially depositing the second active layer 12.

This etching stop layer 24 is very thin so as to avoid disturbing the operation of the transducer, being typically 20 nm thick, and it is made of a material which is very different from that of the layer 12, e.g. GaAs, or better AlAs.

The overall shape is such that the distance between the tabs of the first island (2a) is most advantageously less than twice the quantity represented by the square root of:

$$rho_0 \cdot e_0 / ((rho_1/e_1) + (rho_2/e_2))$$

where: $rho_0$, $rho_1$, and $rho_2$ are the resistivities respectively of the isolating layer 10, the layer 12, and the layer 8, where the layers 12 and 8 are sensitive to pressure and temperature, and in which $e_0$, $e_1$, and $e_2$ are the thicknesses respectively of the isolation layer, sensitive layer 12, and the layer 8.

The distance between the tabs on the second island (2b) is preferably greater than said quantity.

The transducer of the invention may be mounted in an assembly such as that shown in above-mentioned patent Document FR-A-2 629 640. In addition, it is also possible to envisage using manufacturing methods other than that described above.

In particular, it is possible for the layers 4 to 8, 14, and 16 only to be formed by epitaxy and for these layers to be etched so that they remain solely in the second zone 2b of the transducer, thereby forming the second island; then epitaxially depositing the following on the structure as a whole: two layers identical to the layers 4 and 6, the layer 12, and then two layers identical to the layer 14 and the layer 16, and then etching these layers together and stopping on the layer 8 to form the first island. Thereafter the four metallic tabs are made by the "lift off" technique.

In this configuration, the active layers are separated, one for each resistive device. The separator layer 10 is thus no longer necessary.

The resistivities of the sensitive layers 8 and 12 vary with temperature, and thus the resistances of the corresponding resistive devices vary with temperature in a manner which depends strongly on the concentration of donor ions. This can be seen clearly from the curves given in FIGS. 4 to 7.

Curves 4 to 5 relate to two resistive devices constituted by sensitive $Al_xGa_{1-x}As$ layers having $x=0.33$ and doped with different concentrations of silicon: a first resistive device is constituted by a layer doped at about $5 \times 10^{16}$ atoms/cm$^3$, and a second resistive device is constituted by a layer doped at $10^{19}$ atoms/cm$^3$. The electrical resistance, and the pressure and temperature sensitivity of the first resistive device are written respectively R1, Sp1, and ST1, whereas the electrical resistance, and the pressure and temperature sensitivities of the second resistive device are written respectively R2, Sp2, and ST2.

The way in which the resistance R2 depends on pressure and temperature has been determined experimentally, while the way in which the resistance R1 depends on pressure and temperature is an extrapolation.

Figure 4:
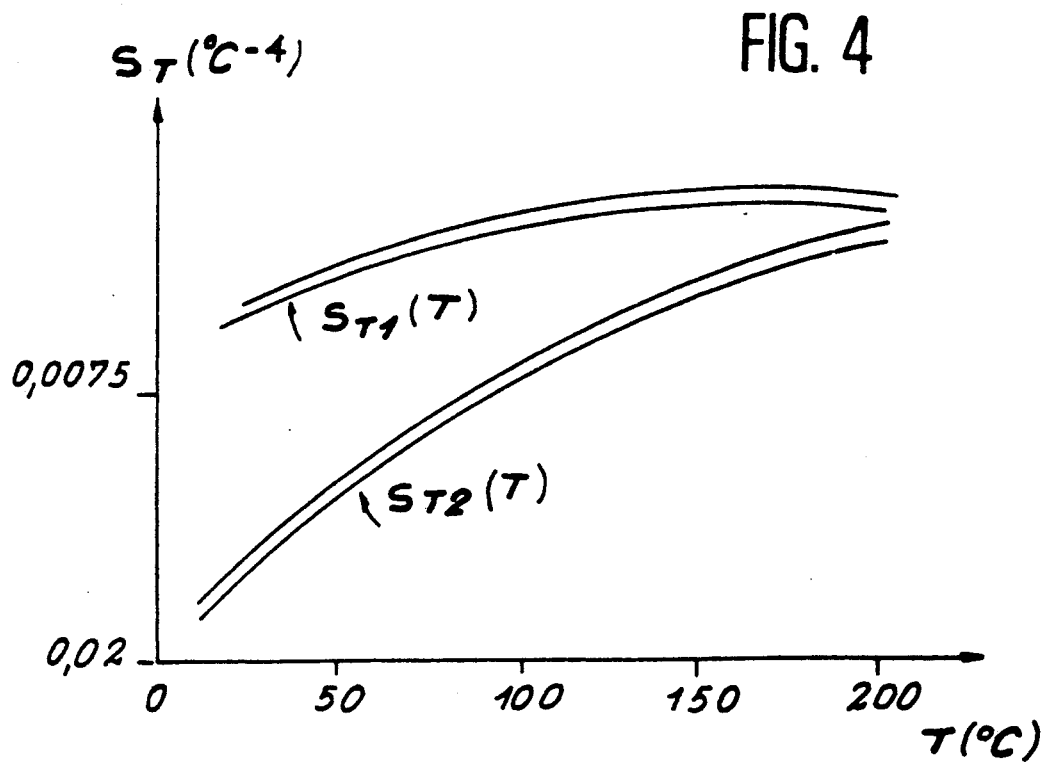
FIGS. 4 to 6 are curves relating to two layers of III-V material sensitive to pressure and to temperature and doped at different concentrations.
Figure 5:
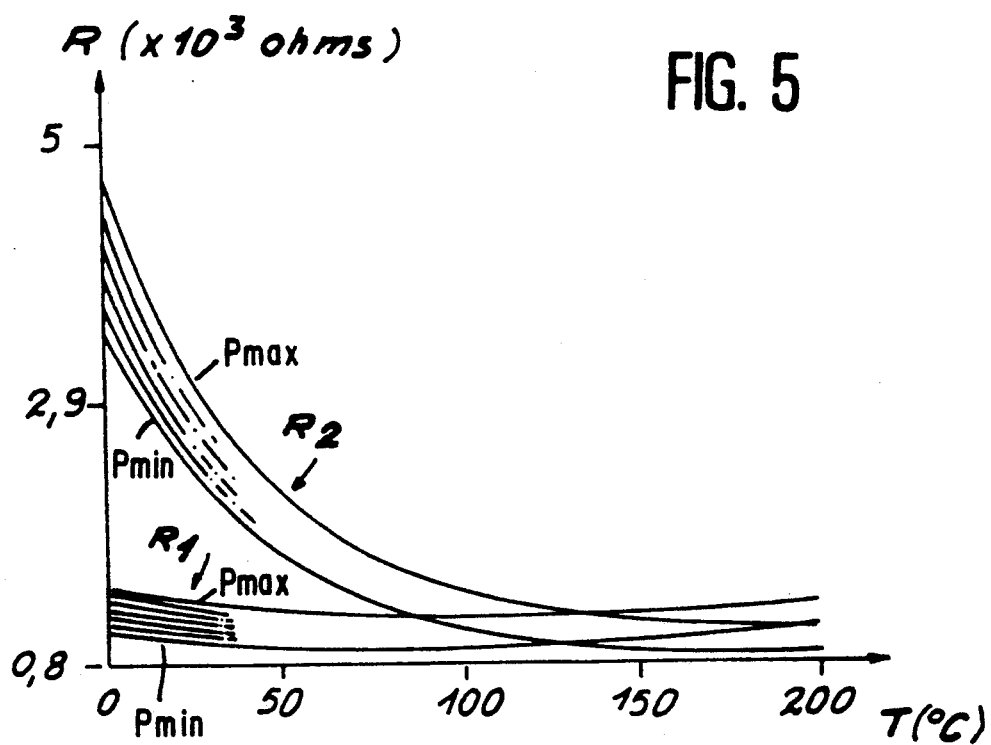

FIG. 4 shows the variation in temperature sensitivity of the first and second resistive devices expressed in °C.$^{-1}$ as a function of temperature in °C., and FIG. 5 shows the variation of the resistance in ohms of these resistive devices as a function of temperature for sets of curves R1 and R2 corresponding to constant pressures, with the curves in each of these two sets lying between respective minimum pressure curves $p_{min}$ and maximum pressure curves $p_{max}$.

As shown in FIG. 5, the two resistive devices have similar pressure sensitivities while their temperature sensitivities are very different.

Figure 6:
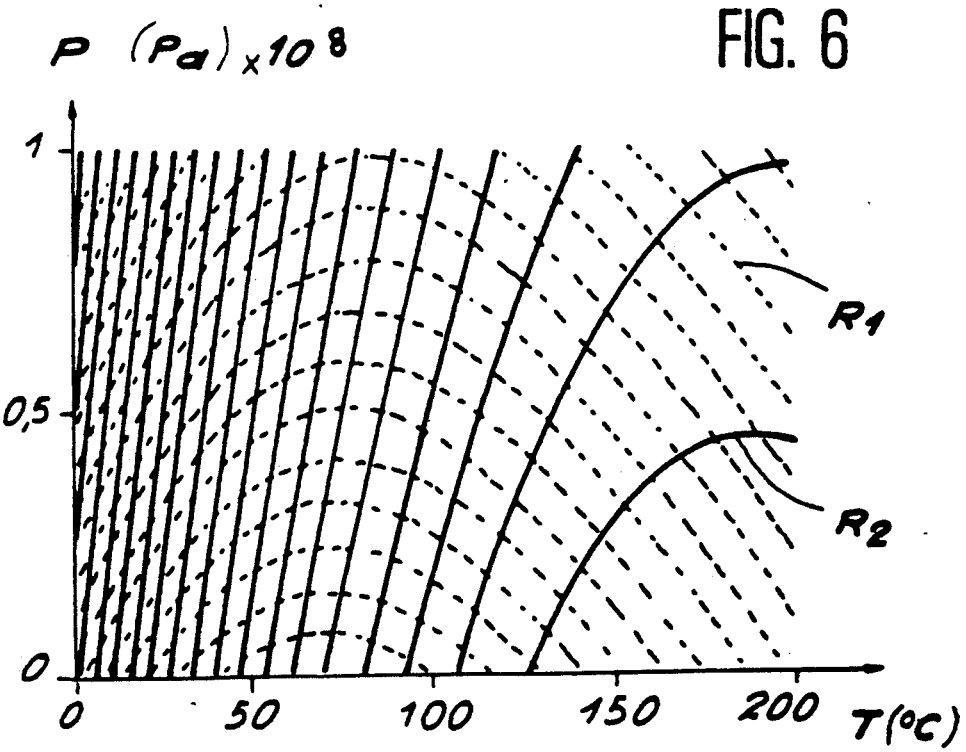

The equations of state R1(T,p) and R2(T,p) as projected onto the pressure-temperature plane can be used to establish equal resistance curves p(T) as shown in FIG. 6. The curves R1 are shown in dashed lines and the curves R2 in solid lines.

It can be seen on this diagram that each cross-point between two equal resistance curves R1 and R2 corresponds to a single pressure value and a single temperature value.

Since the equal resistance curves R1 are not parallel to the curves R2, it is also possible to calculate the pressure resolution dp and the temperature resolution dT for each point in the p.T plane.

These pressure and temperature resolutions are given respectively by equations (1) and (2) below.

$$dp = \frac{\left|\frac{1}{ST1}\right| \times \frac{dR1}{R1} + \left|\frac{1}{ST2}\right| \times \frac{dR2}{R2}}{\left|\frac{Sp1}{ST1} - \frac{Sp2}{ST2}\right|} \quad (1)$$

$$dT = \frac{\left|\frac{1}{Sp1}\right| \times \frac{dR1}{R1} + \left|\frac{1}{Sp2}\right| \times \frac{dR2}{R2}}{\left|\frac{ST1}{Sp1} - \frac{ST2}{Sp2}\right|} \quad (2)$$

The pressure and temperature resolutions dp and dT can thus be determined on the basis of the pressure and temperature sensitivities of each active layer and on the basis of the resolution applicable to measuring the resistances R1 and R2. These resolutions depend on the electronic circuit associated with the transducer and on the resolutions desired as a function of various different applications.

Other experimental results obtained from two differently doped samples having optimized pressure sensitivity are given below. Both of these samples are constituted by silicon-doped $Al_xGa_{1-x}As$ with $x=0.33$.

The sample with lower doping contained $8 \times 10^{16}$ atoms/cm$^3$ of silicon while the sample with higher doping contained $5 \times 10^{18}$ atoms/cm$^3$ of silicon.

Figure 7:
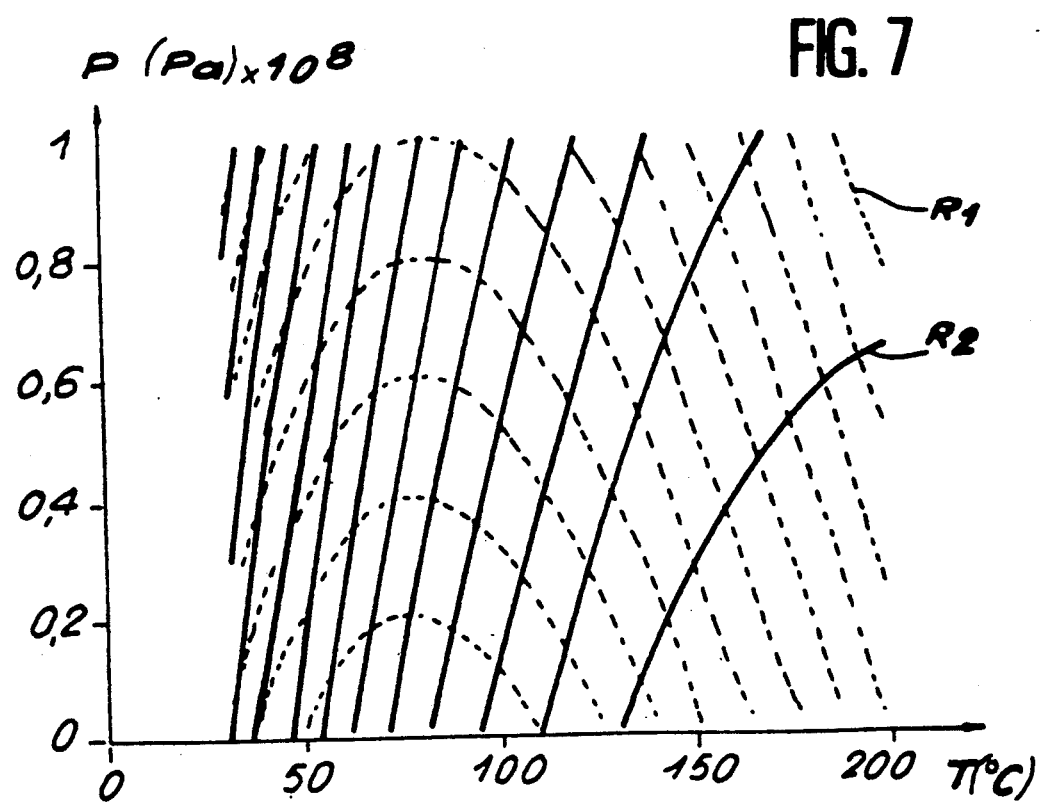
FIG. 7 is a plot of equal resistance curves for different pressure values expressed in kPa as a function of temperature T expressed in °C., as obtained experimentally for two semiconductor layers sensitive to pressure and to temperature and doped to different concentrations.

In FIG. 7, the dashed line curves are equal resistance curves R1 for the less doped sample and the solid line curves are equal resistance curves R2 for the more highly doped sample. In this example, good resolution performance is obtained for temperatures lying in the range 30° C. to 200° C.

Thus, after the transducer has been calibrated in pressure and in temperature, and after the corresponding data concerning the resistances R1 and R2 has been stored, it is possible to determine the pressure and temperature surrounding the transducer with high accuracy by measuring the resistances between tabs 22a–22b and between tabs 22c–22d. This determination can be performed by conventional electronic processing. Thus, for example, a constant current is applied alternately to each of the two resistive devices by means of a constant current source, and the voltage drop across the terminals of each resistive device is measured. This information can then be digitized, e.g. by using an analog-to-digital converter.

On the basis of these digitized signals, pressure and temperature information is extracted by means of a microprocessor-based system in which the calibration points of the two resistive devices have previously been stored for different pressures and temperatures.

We claim:

1. A monolithic pressure and/or temperature transducer comprising at least two sensitive semiconductor layers of III-V material are sensitive to pressure and to temperature, and which are supported by a common substrate of III-V material, said at least two sensitive layers comprising:

a first layer doped with donor type impurities at a first concentration and having a first resistivity as a function of pressure and of temperature; and a second layer doped with donor type impurities at a second concentration different from the first concentration, said second concentration being at least one order of magnitude greater than said first concentration and having a second resistivity as a function of pressure and of temperature, which second resistivity depends on temperature in a different manner than the first resistivity, wherein said first and second pressure and temperature sensitive layers are of substantially the same composition.

2. A transducer according to claim 1, wherein the sensitive layers are made of $Al_xGa_{1-x}As$, where the aluminum fraction x is selected to lie in the range 0.22 to 0.40, and wherein the substrate is made of GaAs.

3. A transducer according to claim 2, wherein x lies in the range 0.30 to 0.35.

4. A transducer according to claim 2, wherein the first sensitive layer is made of $Al_xGa_{1-x}As$ that is N-doped to a concentration $\leq 10^{17}$ atoms/cm$^3$, and wherein the second sensitive layer is made of $Al_xGa_{1-x}As$ that is N-doped to a concentration $\geq 10^{18}$ atoms/cm$^3$.

5. A transducer according to claim 4, comprising, overlying the GaAs substrate:

a buffer layer of GaAs that is not intentionally doped;

a separator layer of $Al_zGa_{1-z}As$ that is not intentionally doped and in which the aluminum fraction z increases smoothly from 0 to x;

a bottom active layer of $Al_xGa_{1-x}As$ that is N-doped;

a separator layer of $Al_yGa_{1-y}As$ that is not intentionally doped where $0.25 \leq y \leq 0.50$ and $y > x$;

a top active layer of $Al_xGa_{1-x}As$ that is N-doped;

a protective layer of $Al_tGa_{1-t}As$ that is not intentionally doped, with $0.22 \leq t \leq 0.60$;

a contact-making layer of N-doped GaAs; and a metal contact layer.

6. A transducer according to claim 1, wherein the sensitive layers are doped with ions of elements from column IV-B of the periodic table.

7. A transducer according to claim 1, wherein the two sensitive layers overlie each other and are separated by a separator layer of III-V material having a forbidden band of greater width than that of the sensitive layers.

8. A transducer according to claim 7, wherein the separator layer is made of $Al_yGa_{1-y}As$ which is not intentionally doped, where y is greater than x and is selected to lie in the range 0.25 to 0.50.

9. A transducer according to claim 8, wherein y is equal to 0.40.

10. A transducer according to claim 7, comprising both a first resistive device comprising a first zone of the first sensitive layer and a zone of the second sensitive layer that overlie each other and that are separated by the separator layer, and a second resistive device comprising a second zone of said first sensitive layer.

11. A transducer according to claim 10, wherein the first resistive device further includes a first pair of metal contacts established on the zone of the second sensitive layer and separated from each other, and wherein the second resistive device includes a second pair of metal contacts established on the second zone of the first sensitive layer, and separated from each other.

12. A transducer according to claim 7, wherein the sensitive layer having the lower concentration of doping ions is situated between the other sensitive layer and the substrate.

* * * * *